United States Patent
Tashiro

(10) Patent No.: US 9,168,711 B2
(45) Date of Patent: Oct. 27, 2015

(54) PRODUCTION METHOD AND PRODUCTION DEVICE OF LONG FIBER REINFORCED PLASTIC STRAND

(75) Inventor: Naoyuki Tashiro, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 92 days.

(21) Appl. No.: 14/002,447

(22) PCT Filed: Mar. 13, 2012

(86) PCT No.: PCT/JP2012/001725
§ 371 (c)(1),
(2), (4) Date: Aug. 30, 2013

(87) PCT Pub. No.: WO2012/127814
PCT Pub. Date: Sep. 27, 2012

(65) Prior Publication Data
US 2013/0333828 A1 Dec. 19, 2013

(30) Foreign Application Priority Data
Mar. 23, 2011 (JP) ................................. 2011-064696

(51) Int. Cl.
*B29D 99/00* (2010.01)
*B29B 15/12* (2006.01)
(Continued)

(52) U.S. Cl.
CPC .......... *B29D 99/0078* (2013.01); *B29B 15/122* (2013.01); *B65H 54/2896* (2013.01); *B29C 53/14* (2013.01); *B29K 2101/12* (2013.01); *B65H 2701/314* (2013.01)

(58) Field of Classification Search
CPC ................ B29B 15/122; B29C 70/52–70/528; B29C 47/0014; B29C 53/14; B65H 54/02
USPC ........................................................ 156/148
See application file for complete search history.

(56) References Cited

U.S. PATENT DOCUMENTS

| 4,479,984 A * | 10/1984 | Levy et al. .................... 427/513 |
| 4,720,366 A | 1/1988 | Binnersley et al. |
| 2010/0224309 A1* | 9/2010 | Tashiro et al. ................ 156/148 |

FOREIGN PATENT DOCUMENTS

| JP | 5 169445 | 7/1993 | |
| JP | 05169445 A * | 7/1993 | .............. B29B 11/16 |

(Continued)

OTHER PUBLICATIONS
Extended European Search Report issued Sep. 22, 2014, in European Patent Application No. 12761062.4.
(Continued)

*Primary Examiner* — Carson Gross
(74) *Attorney, Agent, or Firm* — Oblon, McClelland, Maier & Neustadt, L.L.P.

(57) ABSTRACT

A long fiber reinforced plastic strand production device is provided with: a rotary type haul-off machine which forms a long fiber reinforced plastic strand by drawing out a reinforcing fiber bundle which has been impregnated with a plastic from an impregnation head while rotating the reinforcing fiber bundle around the axis thereof to apply twists in the reinforcing fiber bundle, and draws in the formed long fiber reinforced plastic strand; and a rotary type winding-up machine which introduces the long fiber reinforced plastic strand drawn from the rotary type haul-off machine to a winding bobbin while rotating the long fiber reinforced plastic strand around the axis of the strand in the same direction as the rotation direction of the reinforcing fiber bundle rotated by the rotary type haul-off machine, and winds the rotated long fiber reinforced plastic strand around the winding bobbin. The rotary type winding-up machine is constituted to be capable of rotating the long fiber reinforced plastic strand at a number of rotation smaller than the number of rotation of the reinforcing fiber bundle by the rotary type haul-off machine.

4 Claims, 3 Drawing Sheets

(51) Int. Cl.
  *B65H 54/28* (2006.01)
  *B29C 53/14* (2006.01)
  *B29K 101/12* (2006.01)

(56) References Cited

FOREIGN PATENT DOCUMENTS

| | | |
|---|---|---|
| JP | 6 254856 | 9/1994 |
| JP | 8 39680 | 2/1996 |
| JP | 2006 248758 | 9/2006 |
| WO | 2007 125792 | 11/2007 |

OTHER PUBLICATIONS

Written Opinion of the International Searching Authority Issued Jun. 5, 2012 in PCT/JP12/001725 Filed Mar. 13, 2012.
International Search Report Issued Jun. 5, 2012 in PCT/JP12/001725 Filed Mar. 13, 2012.

* cited by examiner

PRODUCTION METHOD AND PRODUCTION DEVICE OF LONG FIBER REINFORCED PLASTIC STRAND

TECHNICAL FIELD

The present invention relates to a production method and a production device of a long fiber reinforced plastic strand that produces a long fiber reinforced plastic strand wound on a bobbin by forming a twisted long fiber reinforced plastic strand and winding up the formed long fiber reinforced plastic strand on a winding-up bobbin.

BACKGROUND ART

Fiber reinforced thermoplastics have a light weight and an excellent strength. In the fiber reinforced thermoplastics, long fiber reinforced thermoplastics, which includes a reinforcing fiber with a long fiber length, has a particularly excellent impact resistance or rigidity. The long fiber reinforced thermoplastic is used in a form of a string shape for, for example, a gut of a tennis racket or the like.

A long fiber reinforced plastic strand is obtained by forming the long fiber reinforced thermoplastic in a string shape. Hitherto, a production device disclosed in Patent Document 1 has been known as a device for producing a long fiber reinforced plastic strand wound on a bobbin by winding up a long fiber reinforced plastic strand on a winding-up bobbin. FIG. 3 illustrates a configuration of a main part of the production device of the related art. The production device of the related art will be described by referring to FIG. 3.

In FIG. 3, an impregnation head (cross head) 105 is provided. The impregnation head 105 is used to simultaneously impregnate, with a molten thermoplastic, a plurality of reinforcing fiber bundles continuously introduced from a plurality of fiber supply units (supply bobbins) (not illustrated) into the impregnation head 105. A shaping die 109 is attached to the exit end for deriving the fiber bundle which has been impregnated with the plastic from the inside of the impregnation head 105 in the impregnation head 105. Further, a cooling machine (cooling water bath) 110 is provided at the downstream side of the impregnation head 105 and the shaping die 109 in the fiber bundle sending direction. Further, a winding-up machine 118 which includes an arm portion 114, a rotation shaft 115, and a winding-up reel 117 is provided at the downstream side of the cooling machine 110. In the winding-up machine 118, the rotation shaft 115 is positioned on the extension line of the path line as the line along which the fiber bundle passing through the shaping die 109 flows from the impregnation head 105. Then, the winding-up reel 117 is configured to rotate, and is connected to the rotation shaft 115 through the arm portion 114. Further, in FIG. 3, guide rolls 116a and 116b are provided. The guide rolls 116a and 116b are used to assist the movement of the long fiber reinforced plastic strand 113 in the length direction thereof.

In the production device of the related art, the winding-up machine 118 with the above-described configuration twists the reinforcing fiber bundle which has been impregnated with the plastic in a manner that the reinforcing fiber bundle is rotated about its axis (a long axis) while the reinforcing fiber bundle which has been impregnated with the plastic is drawn out from the impregnation head 105. Accordingly, the long fiber reinforced plastic strand 113 is formed. Further, in the production device of the related art, the twisted long fiber reinforced plastic strand 113 is cooled and solidified by a cooling machine 110, and the cooled and solidified long fiber reinforced plastic strand 113 is wound up on the winding-up reel 117.

However, in the production device of the related art, since the winding-up machine 118 may twist the reinforcing fiber bundle which has been impregnated with the plastic and haul off the twisted long fiber reinforced plastic strand to directly wind up the twisted long fiber reinforced plastic strand thereon, the long fiber reinforced plastic strand which has a torsional elastic deformation caused by the twisting is directly wound on the winding-up reel 117. For this reason, when the long fiber reinforced plastic strand is drawn out from the long fiber reinforced plastic strand wound on the bobbin, torsion is generated in the drawn long fiber reinforced plastic strand. As a result, a problem arises in that the long fiber reinforced plastic strand may not be easily handled in the subsequent process.

CITATION LIST

Patent Document

Patent Document 1; JP H05-169445 A

SUMMARY OF THE INVENTION

It is an object of the present invention to provide a production method and a production device of a long fiber reinforced plastic strand capable of suppressing torsion in a long fiber reinforced plastic strand drawn out from the long fiber reinforced plastic strand wound on a bobbin upon production of a long fiber reinforced plastic strand wound on a bobbin by forming a twisted long fiber reinforced plastic strand and winding up the formed long fiber reinforced plastic strand on a winding-up bobbin.

According to an aspect of the present invention, there is provided a long fiber reinforced plastic strand production method including: an impregnation step of continuously introducing a reinforcing fiber bundle into an impregnation head and impregnating a molten thermoplastic into the reinforcing fiber bundle inside the impregnation head; a hauling-off step of forming a long fiber reinforced plastic strand by twisting the reinforcing fiber bundle, which has been impregnated with the plastic, in a manner that the reinforcing fiber bundle is rotated at a predetermined number of rotation about its axis while the reinforcing fiber bundle, which has been impregnated with the plastic, is drawn out from the impregnation head and hauling-off the formed long fiber reinforced plastic strand; and a winding-up step of guiding the long fiber reinforced plastic strand, which has been hauled off in the hauling-off step, to a winding-up bobbin while rotating the long fiber reinforced plastic strand about the axis of the long fiber reinforced plastic strand in the same rotation direction as that of the reinforcing fiber bundle in the hauling-off step after the hauling-off step, and winding up the rotated long fiber reinforced plastic strand on the winding-up bobbin, in which in the winding-up step, the long fiber reinforced plastic strand is rotated at the number of rotation smaller than that of the reinforcing fiber bundle in the hauling-off step so that a torsional elastic deformation, which has been generated in the long fiber reinforced plastic strand in the hauling-off step, is reduced.

According to another aspect of the present invention, there is provided a long fiber reinforced plastic strand production device including: an impregnation head to which a reinforcing fiber bundle is introduced and the reinforcing fiber bundle is impregnated with a molten thermoplastic; a rotary type haul-off machine which forms a long fiber reinforced plastic strand by twisting the reinforcing fiber bundle, which has been impregnated with the plastic, in a manner that the reinforcing fiber bundle is rotated about its axis while the reinforcing fiber bundle, which has been impregnated with the plastic, is drawn out from the impregnation head, and hauls off the formed long fiber reinforced plastic strand; and a rotary type winding-up machine which draws the long fiber reinforced plastic strand, which has been hauled off by the rotary type haul-off machine, from the rotary type haul-off machine, guides the drawn long fiber reinforced plastic strand to a winding-up bobbin while rotating the long fiber reinforced plastic strand about the axis of the long fiber reinforced plastic strand in the same rotation direction as that of the reinforcing fiber bundle by the rotary type haul-off machine, and winds up the rotated long fiber reinforced plastic strand on the winding-up bobbin, in which the rotary type winding-up machine is configured so as to rotate the long fiber reinforced plastic strand at the number of rotation smaller than the number of rotation of the reinforcing fiber bundle by the rotary type haul-off machine.

DESCRIPTION OF EMBODIMENTS

Figure 1:
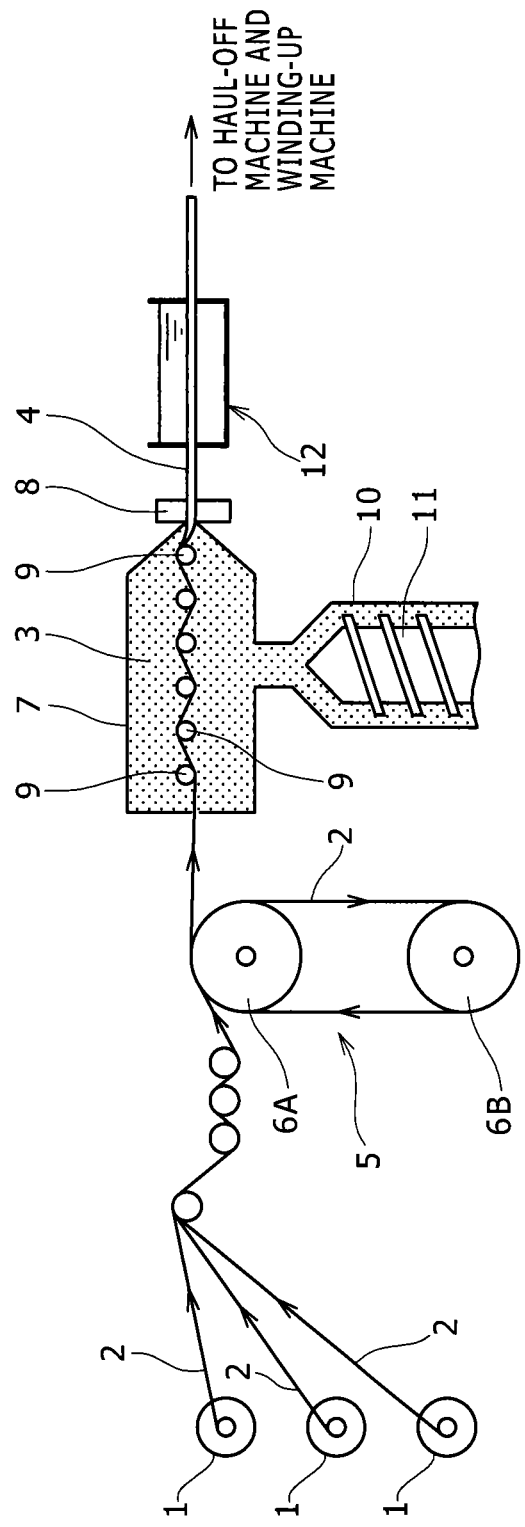
FIG. 1 is a diagram illustrating a configuration of a front-half part of a long fiber reinforced plastic strand production device according to an embodiment of the present invention.

Hereinafter, an embodiment of the present invention will be described by referring to the drawings.

Figure 2:
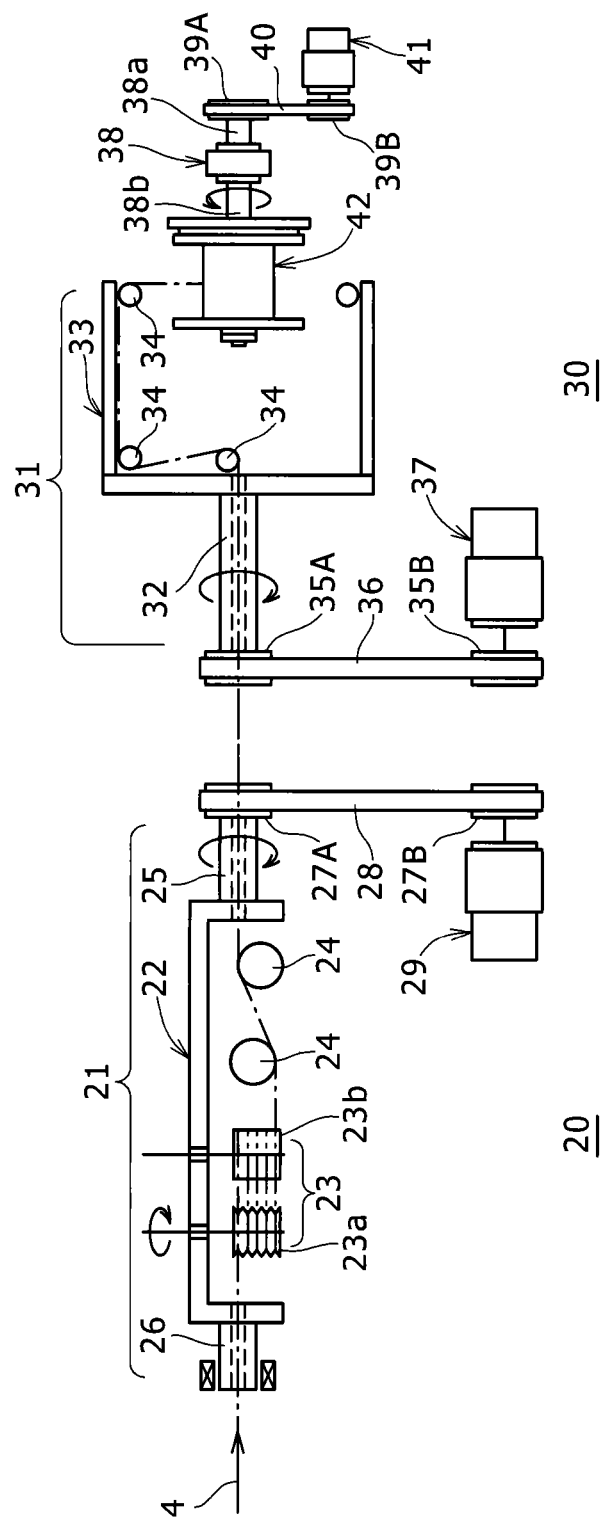
FIG. 2 is a diagram illustrating a configuration of a rear-half part of the long fiber reinforced plastic strand production device according to an embodiment of the present invention.
Figure 3:
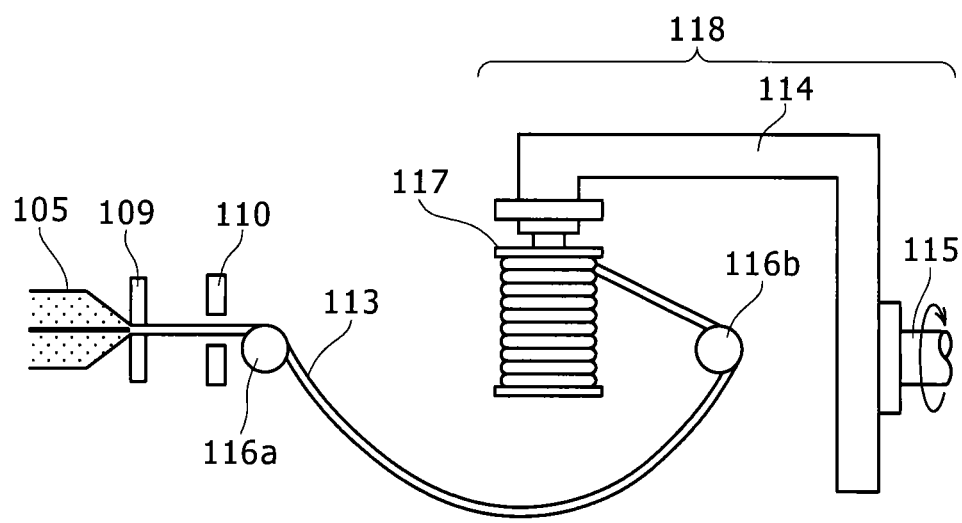
FIG. 3 is a diagram illustrating a configuration of a main part of a long fiber reinforced plastic strand production device in the related art.

As illustrated in FIG. 1, a long fiber reinforced plastic strand production device according to an embodiment of the present invention includes a plurality of coils 1 (roving package), a pre-heat heating device 5, an impregnation head 7, a die nozzle 8, a plurality of impregnation rollers 9, an extruding machine 10, a cooling water bath 12, a rotary type haul-off machine 20 (see FIG. 2), and a rotary type winding-up machine 30 (see FIG. 2).

Each coil 1 winds a reinforcing fiber bundle (roving) thereon. The coil 1 is included in the concept of the fiber supply unit of the present invention.

The pre-heat heating device 5 is used to preheat a reinforcing fiber bundle 2 before the reinforcing fiber bundle 2 drawn from the coil 1 is impregnated with a plastic. The pre-heat heating device 5 includes a pair of heating rollers 6A and 6B. In the long fiber reinforced plastic strand production device according to this embodiment, the respective reinforcing fiber bundles 2 are drawn from the respective coils 1, and these plural (three in the example of FIG. 1) reinforcing fiber bundles 2 are bundled together and are guided to the pre-heat heating device 5. The pre-heat heating device 5 increases the temperature of the plurality of reinforcing fiber bundles 2 guided to the pre-heat heating device 5 by the pair of heating rollers 6A and 6B. The plurality of reinforcing fiber bundles 2 of which the temperatures are increased by the pre-heat heating device 5 are guided into the impregnation head 7.

The impregnation head 7 simultaneously impregnates, with a molten thermoplastic 3, the plurality of reinforcing fiber bundles 2 which are continuously guided from the plurality of coils 1 into the impregnation head 7 through the pre-heat heating device 5. The impregnation head 7 is connected with an extruding machine 10. The extruding machine 10 includes therein a screw 11 which extrudes the molten plastic. The extruding machine 10 continuously supplies the molten thermoplastic 3 to the impregnation head 7 by extruding the molten thermoplastic 3 by the rotating screw 11. A plurality of impregnation rollers 9 are disposed inside the impregnation head 7. The plurality of impregnation rollers 9 are used to impregnate the molten thermoplastic 3 to the reinforcing fiber bundle 2. The plurality of reinforcing fiber bundles 2 are impregnated with the molten thermoplastic 3 while passing through the inside of the impregnation head 7. Further, the impregnation head 7 includes an exit through which the reinforcing fiber bundles 2 impregnated with the plastic are derived from the inside of the impregnation head 7. A die nozzle 8 is attached to an exit end as the end provided with the exit in the impregnation head 7. The die nozzle 8 is used to define the cross-sectional shape of the reinforcing fiber bundle 2 impregnated with the plastic. Specifically, the die nozzle 8 includes a hole through which the plurality of reinforcing fiber bundles 2 impregnated with the plastic pass, and the plurality of reinforcing fiber bundles 2 impregnated with the plastic passing through the hole are united as one string shape having a substantially circular cross-section.

The cooling water bath 12 is used to cool the reinforcing fiber bundle 2 impregnated with the plastic derived from the exit of the impregnation head 7 and passing through the die nozzle 8. The cooling water bath 12 may store cooling water, and the reinforcing fiber bundle 2 impregnated with the plastic passes through the cooling water bath 12. The reinforcing fiber bundle 2 impregnated with the plastic is cooled and solidified by the cooling water while passing through the cooling water bath 12.

A rotary type haul-off machine 20 is provided at the downstream side of the impregnation head 7, and specifically, the downstream side of the cooling water bath 12. Furthermore, in the specification, the "downstream side" indicates the downstream side in the direction in which the reinforcing fiber bundle 2 or a long fiber reinforced plastic strand 4 to be described below is sent. The rotary type haul-off machine 20 twists the united reinforcing fiber bundles 2 passing through the die nozzle 8 about its axis while drawing out the plurality of reinforcing fiber bundles 2 impregnated with the plastic from the impregnation head 7. Then, the rotary type haul-off machine 20 hauls off the reinforcing fiber bundle obtained after the reinforcing fiber bundles 2 are united and twisted and pass through the cooling water bath 12 so as to be cooled and solidified. The long fiber reinforced plastic strand 4 is obtained by uniting and twisting the plurality of reinforcing fiber bundles 2 impregnated with the plastic. That is, the rotary type haul-off machine 20 hauls off the long fiber reinforced plastic strand 4 which is cooled and solidified after passing through the cooling water bath 12.

The rotary type winding-up machine 30 is provided at the further downstream side of the rotary type haul-off machine 20. The rotary type winding-up machine 30 is used to wind up the long fiber reinforced plastic strand 4 which is hauled off by the rotary type haul-off machine 20 on a winding-up bobbin 42.

Next, referring to FIG. 2, the configuration of the rotary type haul-off machine 20 and the configuration of the rotary type winding-up machine 30 will be described in detail.

The rotary type haul-off machine 20 and the rotary type winding-up machine 30 are provided at the downstream side of the cooling water bath 12 (see FIG. 1) in this order from the upstream side to the downstream side.

As described above, the rotary type haul-off machine 20 forms the long fiber reinforced plastic strand 4 by rotating and twisting the reinforcing fiber bundles 2 impregnated with the plastic while drawing out the reinforcing fiber bundle 2 impregnated with the plastic from the impregnation head 7, and hauls off the long fiber reinforced plastic strand 4 which is cooled and solidified in the cooling water bath 12. Since the rotary type haul-off machine 20 rotates the reinforcing fiber bundle 2, the reinforcing fiber bundles 2 which are not solidified yet at the upstream side of the cooling water bath 12 are twisted, and the reinforcing fiber bundles 2 which are solidified at the downstream side of the cooling water bath 12 undergoes a torsional elastic deformation.

In this embodiment, the rotary type haul-off machine 20 includes a haul-off machine rotation body 21, a pair of haul-off machine pulleys 27A and 27B, a haul-off machine rotation belt 28, and a haul-off machine rotation motor 29.

The haul-off machine rotation body 21 is rotatable about the axis of the long fiber reinforced plastic strand 4 passing through the cooling water bath 12. The haul-off machine rotation body 21 includes a haul-off machine rotation main body 22, a double capstan 23, a plurality of haul-off machine guide rollers 24, a haul-off machine rotation drive shaft 25, and a haul-off machine rotation driven shaft 26.

The double capstan 23 hauls off the long fiber reinforced plastic strand 4 passing through the cooling water bath 12. The double capstan 23 includes a driving capstan 23a and a driven capstan 23b. The long fiber reinforced plastic strand 4 is hung on the driving capstan 23a and the driven capstan 23b. The driving capstan 23a is connected with a driving mechanism (not illustrated) such as a motor that rotationally drives the driving capstan 23a. In this embodiment, the driving mechanism such as a motor is attached to the haul-off machine rotation main body 22. When the driving capstan 23a is rotated by the driving mechanism such as a motor, the driven capstan 23b rotates, and the long fiber reinforced plastic strand 4 is hauled off by both capstans 23a and 23b.

The plurality of haul-off machine guide rollers 24 are used to guide the long fiber reinforced plastic strand 4 drawn out from the double capstan 23 to the downstream side. The respective haul-off machine guide rollers 24 are attached to the haul-off machine rotation main body 22 so as to be rotatable about its axes.

The haul-off machine rotation drive shaft 25 is fixed to the downstream end of the haul-off machine rotation main body 22, and the haul-off machine rotation driven shaft 26 is fixed to the upstream end of the haul-off machine rotation main body 22. The haul-off machine rotation drive shaft 25 and the haul-off machine rotation driven shaft 26 are disposed so that the axes thereof match the rotation center line (the rotation axis) of the haul-off machine rotation body 21. The haul-off machine rotation driven shaft 26 is supported by a bearing so as to be rotatable about its axis. A penetration hole is formed in the haul-off machine rotation drive shaft 25 so as to be concentric with the haul-off machine rotation drive shaft 25 and to penetrate the haul-off machine rotation drive shaft 25 in the axial direction. Further, the same penetration hole is formed in the haul-off machine rotation driven shaft 26. The long fiber reinforced plastic strand 4 which passes through the cooling water bath 12 passes through the penetration hole of the haul-off machine rotation driven shaft 26 along the path line (the traveling line of the long fiber reinforced plastic strand 4) which extends linearly through the cooling water bath 12 from the impregnation head 7 to the rotary type haul-off machine 20, and passes through the penetration hole of the haul-off machine rotation drive shaft 25 along the path line through the haul-off machine guide roller 24.

One haul-off machine pulley 27A of the pair of haul-off machine pulleys 27A and 27B is fixed to the haul-off machine rotation drive shaft 25 of the haul-off machine rotation body 21 so as to be coaxial with the haul-off machine rotation drive shaft 25. The other haul-off machine pulley 27B of the pair of haul-off machine pulleys 27A and 27B is disposed at a position away from one haul-off machine pulley 27A, that is, the haul-off machine pulley 27A near the haul-off machine rotation drive shaft 25 so that its rotation shaft is parallel to the haul-off machine pulley 27A near the haul-off machine rotation drive shaft 25. The other haul-off machine pulley 27B is connected to the drive shaft of the haul-off machine rotation motor 29.

The haul-off machine rotation belt 28 is provided between the pair of haul-off machine pulleys 27A and 27B. The haul-off machine rotation belt 28 is used to transmit a rotational force from the other haul-off machine pulley 27B, that is, the motor side haul-off machine pulley 27B to the haul-off machine pulley 27A near the haul-off machine rotation drive shaft 25.

The haul-off machine rotation motor 29 is used to rotate the haul-off machine rotation body 21 through the motor side haul-off machine pulley 27B, the haul-off machine rotation belt 28, and the haul-off machine pulley 27A near the haul-off machine rotation drive shaft 25. Specifically, when the haul-off machine rotation motor 29 is operated, the motor side haul-off machine pulley 27B connected to the drive shaft of the haul-off machine rotation motor 29 rotates, and the rotational force of the haul-off machine pulley 27B is transmitted to the haul-off machine pulley 27A near the haul-off machine rotation drive shaft 25 through the haul-off machine rotation belt 28. Accordingly, the haul-off machine rotation body 21 rotates along with the haul-off machine pulley 27A near the haul-off machine rotation drive shaft 25.

Next, the rotary type winding-up machine 30 will be described. The rotary type winding-up machine 30 is provided at the downstream side of the rotary type haul-off machine 20. The rotary type winding-up machine 30 draws the long fiber reinforced plastic strand 4 hauled off by the rotary type haul-off machine 20 from the rotary type haul-off machine 20, guides the drawn long fiber reinforced plastic strand 4 to the winding-up bobbin 42 while rotating the strand about its axis in the same rotation direction as that of the reinforcing fiber bundle 2 by the rotary type haul-off machine 20, and winds up the rotated long fiber reinforced plastic strand 4 on the winding-up bobbin 42. Then, the rotary type winding-up machine 30 is configured to rotate the long fiber reinforced plastic strand 4 at the number of rotation lower than the number of rotation of the reinforcing fiber bundle 2 (the long fiber reinforced plastic strand 4) by the rotary type haul-off machine 20 so that the torsional elastic deformation applied to the long fiber reinforced plastic strand 4 is reduced by the rotary type haul-off machine 20. Further, the rotary type winding-up machine 30 guides the long fiber reinforced plastic strand 4 to the winding-up bobbin 42 while rotating the strand about the same axis as the rotation axis of the reinforcing fiber bundle 2 (the long fiber reinforced plastic strand 4) by the rotary type haul-off machine 20.

The number of rotation of the long fiber reinforced plastic strand 4 by the rotary type winding-up machine 30 is set to an appropriate number of rotation which causes the torsional elastic deformation applied to the long fiber reinforced plastic strand 4 by the rotary type haul-off machine 20 to be reduced, but does not cause a torsional deformation in a direction opposite to the torsion in the long fiber reinforced plastic strand 4. In other words, the number of rotation of the long fiber reinforced plastic strand 4 by the rotary type winding-up machine 30 is set to the number of rotation which is lower than the number of rotation of the long fiber reinforced plastic strand 4 by the rotary type haul-off machine 20 and is higher than the number of rotation which causes the torsional deformation in the opposite direction in the long fiber reinforced plastic strand 4. Specifically, the number of rotation of the long fiber reinforced plastic strand 4 by the rotary type winding-up machine 30 is set to have an appropriately difference in number of rotation between the number of rotation and the number of rotation of the long fiber reinforced plastic strand 4 by the rotary type haul-off machine 20 so that the torsional elastic deformation applied to the long fiber reinforced plastic strand 4 by the rotary type haul-off machine 20 is reduced and the torsional deformation in the opposite direction to the torsion is not generated in the long fiber reinforced plastic strand 4. Since the magnitude of the torsional elastic deformation applied to the long fiber reinforced plastic strand 4 by the rotary type haul-off machine 20 changes by various factors such as the number of rotation and the hauling-off speed of the long fiber reinforced plastic strand 4 by the rotary type haul-off machine 20, the material forming the long fiber reinforced plastic strand 4, and the thickness of the long fiber reinforced plastic strand 4, the appropriate number of rotation of the long fiber reinforced plastic strand 4 by the rotary type winding-up machine 30 is appropriately set by these various factors. Specifically, the number of rotation of the long fiber reinforced plastic strand 4 by the rotary type winding-up machine 30 is adjusted to the most appropriate number of rotation which causes the torsional elastic deformation of the long fiber reinforced plastic strand 4 to be solved and does not cause the torsional deformation in the opposite direction in the long fiber reinforced plastic strand 4 in a manner that the production device is actually operated to manufacture the long fiber reinforced plastic strand 4 and to check the state of the long fiber reinforced plastic strand 4.

In this embodiment, the rotary type winding-up machine 30 includes a winding-up machine rotation body 31, a pair of winding-up machine rotation pulleys 35A and 35B, a winding-up machine rotation belt 36, a winding-up machine rotation motor 37, a powder clutch 38, a pair of winding-up pulleys 39A and 39B, a winding-up belt 40, a winding-up motor 41, a winding-up bobbin 42, and a traverse mechanism (not illustrated).

The winding-up machine rotation body 31 is rotatable about the axis of the long fiber reinforced plastic strand 4 drawn out from the rotary type haul-off machine 20. The winding-up machine rotation body 31 is rotatable about the same axis as the rotation axis of the haul-off machine rotation body 21. The winding-up machine rotation body 31 includes a winding-up machine rotation drive shaft 32, a winding-up machine rotation main body 33, and a plurality of winding-up machine guide rollers 34.

The winding-up machine rotation drive shaft 32 is disposed so that its axis matches the rotation center line (the rotation axis line) of the winding-up machine rotation body 31. A penetration hole is formed in the winding-up machine rotation drive shaft 32 so as to be concentric with the winding-up machine rotation drive shaft 32 and to penetrate the winding-up machine rotation drive shaft 32 in the axial direction. The long fiber reinforced plastic strand 4 drawn out from the rotary type haul-off machine 20 passes through the penetration hole of the winding-up machine rotation drive shaft 32 along the path line directly at the downstream side of the rotary type haul-off machine 20.

The winding-up machine rotation main body 33 is fixed to the downstream end of the winding-up machine rotation drive shaft 32, and may rotate about the axis of the winding-up machine rotation drive shaft 32 along with the winding-up machine rotation drive shaft 32.

The plurality of winding-up machine guide rollers 34 are attached to the inside of the winding-up machine rotation main body 33. The plurality of winding-up machine guide rollers 34 are used to guide the long fiber reinforced plastic strand 4 which is drawn out from the rotary type haul-off machine 20 and passes through the penetration hole of the winding-up machine rotation drive shaft 32 to the winding-up bobbin 42 while rotating the strand about its axis.

One winding-up machine rotation pulley 35A of the pair of winding-up machine rotation pulleys 35A and 35B is fixed to the winding-up machine rotation drive shaft 32 of the winding-up machine rotation body 31 so as to be coaxial with the winding-up machine rotation drive shaft 32. The other winding-up machine rotation pulley 35B of the pair of winding-up machine rotation pulleys 35A and 35B is disposed at a position away from one winding-up machine rotation pulley 35A, that is, the winding-up machine rotation pulley 35A near the winding-up machine rotation drive shaft 32 so that the rotation shaft is parallel to the rotation shaft of the winding-up machine rotation pulley 35A near the winding-up machine rotation drive shaft 32. The other winding-up machine rotation pulley 35B is connected to the drive shaft of the winding-up machine rotation motor 37.

The winding-up machine rotation belt 36 is provided between the pair of winding-up machine rotation pulleys 35A and 35B. The winding-up machine rotation belt 36 is used to transmit a rotational force from the other winding-up machine rotation pulley 35B, that is, the motor side winding-up machine rotation pulley 35B to the winding-up machine rotation pulley 35A near the winding-up machine rotation drive shaft 32.

The winding-up machine rotation motor 37 rotates the winding-up machine rotation body 31 in the same direction as the rotation direction of the haul-off machine rotation body 21 through the motor side winding-up machine rotation pulley 35B, the winding-up machine rotation belt 36, and the winding-up machine rotation pulley 35A near the winding-up machine rotation drive shaft 32. Specifically, when the winding-up machine rotation motor 37 is operated, the motor side winding-up machine rotation pulley 35B connected to the drive shaft of the winding-up machine rotation motor 37 rotates, and the rotational force of the winding-up machine rotation pulley 35B is transmitted to the winding-up machine rotation pulley 35A near the winding-up machine rotation drive shaft 32 through the winding-up machine rotation belt 36. Accordingly, the winding-up machine rotation body 31 rotates along with the winding-up machine rotation pulley 35A near the winding-up machine rotation drive shaft 32.

An input shaft 38$a$ is fixed to one winding-up pulley 39A of the pair of winding-up pulleys 39A and 39B so as to be coaxial with the winding-up pulley 39A. An output shaft 38$b$ is fixed to the winding-up bobbin 42 so as to be coaxial with the winding-up bobbin 42. Further, the output shaft 38$b$ is provided so that the rotation axis of the output shaft 38$b$ is positioned on the extension line of the rotation axis of the winding-up machine rotation drive shaft 32 of the winding-up machine rotation body 31.

The powder clutch (slide clutch) 38 is provided between the input shaft 38$a$ and the output shaft 38$b$ so as to connect the input shaft 38$a$ and the output shaft 38$b$ to each other by an electromagnetic coupling force. The powder clutch 38 is configured to adjust the electromagnetic coupling force between the input shaft 38$a$ and the output shaft 38$b$. Specifically, the powder clutch 38 includes a torque adjuster (not illustrated) which is used to adjust the electromagnetic coupling force (the torque transmitting force from the input shaft $38a$ to the output shaft $38b$) between the input shaft $38a$ and the output shaft $38b$. The powder clutch 38 adjusts the winding tension so that the winding tension as the tension applied to the long fiber reinforced plastic strand 4 when winding up the long fiber reinforced plastic strand 4 on the winding-up bobbin 42 is maintained at a value lower than a predetermined value by the function of adjusting the electromagnetic coupling force of the torque adjuster. In general, when the winding-up amount of the long fiber reinforced plastic strand 4 of the winding-up bobbin 42 increases and the winding-up radius of the long fiber reinforced plastic strand 4 of the winding-up bobbin 42 gradually increases, the winding tension of the long fiber reinforced plastic strand 4 decreases. In this embodiment, since the winding tension is adjusted by the powder clutch 38, the winding tension does not become the predetermined value or more regardless of the magnitude of the winding-up radius. The powder clutch 38 is included in the concept of the winding tension adjuster of the present invention. Furthermore, as the winding tension adjuster instead of the powder clutch 38, a control device which controls a winding-up motor may be used so as to adjust the torque of the shaft attached with the winding-up bobbin 42, that is, the winding tension applied to the long fiber reinforced plastic strand 4 wound on the winding-up bobbin 42.

As described above, one winding-up pulley 39A of the pair of winding-up pulleys 39A and 39B is fixed to the input shaft $38a$ of the powder clutch 38 so as to be coaxial with the input shaft $38a$. The other winding-up pulley 39B of the pair of winding-up pulleys 39A and 39B is disposed at a position away from one winding-up pulley 39A, that is, the winding-up pulley 39A near the input shaft $38a$ so that the rotation shaft is parallel to the rotation shaft of the winding-up pulley 39A near the input shaft $38a$. The other winding-up pulley 39B is connected to the drive shaft of the winding-up motor 41.

The winding-up belt 40 is provided between the pair of winding-up pulleys 39A and 39B. The winding-up belt 40 is used to transmit a rotational force from the other winding-up pulley 39B, that is, the motor side winding-up pulley 39B to the winding-up pulley 39A near the input shaft $38a$.

The winding-up motor 41 applies a rotational driving force to the input shaft $38a$ through the motor side winding-up pulley 39B, the winding-up belt 40, and the winding-up pulley 39A near the input shaft $38a$. Specifically, when the winding-up motor 41 is operated, the motor side winding-up pulley 39B connected to the drive shaft of the winding-up motor 41 rotates, and the rotational force of the winding-up pulley 39B is transmitted to the winding-up pulley 39A near the input shaft $38a$ through the winding-up belt 40. Accordingly, the input shaft $38a$ rotates along with the winding-up pulley 39A.

The winding-up bobbin 42 is used to wind up the long fiber reinforced plastic strand 4 guided by the plurality of winding-up machine guide rollers 34 of the winding-up machine rotation body 31. In this embodiment, the winding-up bobbin 42 is configured to wind up the long fiber reinforced plastic strand 4 while rotating about the same axis as the rotation axis in which the rotary type winding-up machine 30 rotates the reinforcing fiber bundle 2 impregnated with the plastic (the long fiber reinforced plastic strand 4). Specifically, the winding-up bobbin 42 winds up the long fiber reinforced plastic strand 4 while rotating about the same axis as the rotation axis of the haul-off machine rotation body 21 and the rotation axis of the winding-up machine rotation body 31. A rotational force is transmitted from the input shaft $38a$ to the output shaft $38b$ through the powder clutch 38, so that the output shaft $38b$ rotates and the winding-up bobbin 42 rotates about the same axis as that of the output shaft $38b$ along with the output shaft $38b$.

The traverse mechanism (not illustrated) is used to regularly wind the long fiber reinforced plastic strand 4 on the winding-up bobbin 42. The traverse mechanism relatively rotates the winding-up bobbin 42 and the winding-up machine rotation body 31 along these rotation axes so that the long fiber reinforced plastic strand 4 guided by the plurality of winding-up machine guide rollers 34 is regularly wound on the winding-up bobbin 42.

Next, the long fiber reinforced plastic strand production method according to an embodiment of the present invention using the long fiber reinforced plastic strand production device of this embodiment will be described.

In the long fiber reinforced plastic strand production method according to this embodiment, the plurality of reinforcing fiber bundles 2 drawn out from the plurality of coils 1 are first set so as to reach the winding-up bobbin 42 of the rotary type winding-up machine 30 through the pre-heat heating device 5, the die nozzle 8, the cooling water bath 12, and the rotary type haul-off machine 20. Then, when the double capstan 23 of the rotary type haul-off machine 20 rotates so as to pull the reinforcing fiber bundle 2, the plurality of reinforcing fiber bundles 2 drawn out from the plurality of coils 1 are continuously introduced into the impregnation head 7 through the pre-heat heating device 5. The plurality of reinforcing fiber bundles 2 which are introduced into the impregnation head 7 are simultaneously impregnated with the molten thermoplastic 3 supplied from the extruding machine 10 into the impregnation head 7 by the plurality of impregnation rollers 9. The plurality of reinforcing fiber bundles 2 impregnated with the plastic are drawn out from the impregnation head 7, and pass through the die nozzle 8 so as to be united as one long fiber reinforced plastic strand 4 having a circular cross-section. The united long fiber reinforced plastic strand 4 passes through the cooling water bath 12 later so as to be cooled and solidified, and is hauled off to the rotary type haul-off machine 20.

Then, in the rotary type haul-off machine 20, the haul-off machine rotation motor 29 rotates the haul-off machine rotation body 21 about its rotation shaft through the motor side haul-off machine pulley 27B, the haul-off machine rotation belt 28, and the haul-off machine pulley 27A near the haul-off machine rotation drive shaft 25 while rotating the double capstan 23 as described above. For this reason, in the rotary type haul-off machine 20, the long fiber reinforced plastic strand 4 rotates about its axis at a predetermined number of rotation while the long fiber reinforced plastic strand 4 is hauled off to the double capstan 23. As a result, the reinforcing fiber bundle 2 impregnated with the plastic (the long fiber reinforced plastic strand 4) which is not cooled and solidified at the upstream side of the cooling water bath 12 is twisted about its axis. For this reason, the twisted long fiber reinforced plastic strand 4 is cooled and solidified in the cooling water bath 12. Further, a torsional elastic deformation is generated in the long fiber reinforced plastic strand 4 which is cooled and solidified after passing through the cooling water bath 12. Then, the twisted long fiber reinforced plastic strand 4 is hauled off to the double capstan 23.

The long fiber reinforced plastic strand 4 which is hauled off to the double capstan 23 of the rotary type haul-off machine 20 is drawn out from the double capstan 23 by the rotary type winding-up machine 30, and is introduced to the rotary type winding-up machine 30 along the penetration hole of the haul-off machine rotation drive shaft 25 through the plurality of haul-off machine guide rollers 24.

The long fiber reinforced plastic strand 4 which is introduced into the rotary type winding-up machine 30 is guided to the winding-up bobbin 42 along the penetration hole of the winding-up machine rotation drive shaft 32 by the plurality of winding-up machine guide rollers 34. When guiding the long fiber reinforced plastic strand 4 to the winding-up bobbin 42, the winding-up machine rotation motor 37 rotates the winding-up machine rotation body 31 about its the rotation shaft in the same rotation direction as that of the haul-off machine rotation body 21 through the motor side winding-up machine rotation pulley 35B, the winding-up machine rotation belt 36, and the winding-up machine rotation pulley 35A near the winding-up machine rotation drive shaft 32. Accordingly, in the step of winding up the long fiber reinforced plastic strand 4 by the rotary type winding-up machine 30, the long fiber reinforced plastic strand 4 is guided to the winding-up bobbin 42 while rotating about the same axis as the case of rotating the reinforcing fiber bundle 2 (the long fiber reinforced plastic strand 4) in the hauling-off step by the rotary type haul-off machine 20 in the same rotation direction as that of the reinforcing fiber bundle 2 (the long fiber reinforced plastic strand 4) in the hauling-off step. Then, in the winding-up step, the long fiber reinforced plastic strand 4 is rotated at the number of rotation lower than the number of rotation of the reinforcing fiber bundle 2 (the long fiber reinforced plastic strand 4) of the hauling-off step so that the torsional elastic deformation generated in the long fiber reinforced plastic strand 4 in the hauling-off step is reduced. That is, the winding-up machine rotation body 31 rotates at the number of rotation lower than the number of rotation of the haul-off machine rotation body 21. The rotation of the long fiber reinforced plastic strand 4 by the rotary type winding-up machine 30 is later than the rotation of the long fiber reinforced plastic strand 4 by the rotary type haul-off machine 20, and is relatively opposite to the rotation of the long fiber reinforced plastic strand 4 by the rotary type haul-off machine 20. As a result, in the rotary type winding-up machine 30, the torsional elastic deformation applied to the long fiber reinforced plastic strand 4 by the rotary type haul-off machine 20 is reduced. However, since the number of rotation of the long fiber reinforced plastic strand 4 by the rotary type winding-up machine 30 is not low to the degree in which the torsional deformation in the opposite direction is generated in the long fiber reinforced plastic strand 4 with respect to the number of rotation of the long fiber reinforced plastic strand 4 by the rotary type haul-off machine 20, the torsional deformation in the opposite direction is not generated in the long fiber reinforced plastic strand 4.

Then, in the rotary type winding-up machine 30, the winding-up motor 41 rotates the input shaft 38a, the output shaft 38b, and the winding-up bobbin 42 about its rotation shaft through the motor side winding-up pulley 39B, the winding-up belt 40, and the winding-up pulley 39A near the input shaft 38a, the winding-up machine rotation body 31 rotates, and the long fiber reinforced plastic strand 4 of which the torsional elastic deformation is reduced is wound on the winding-up bobbin 42. In the step of winding up the long fiber reinforced plastic strand 4 on the winding-up bobbin 42, the winding tension applied to the long fiber reinforced plastic strand 4 is adjusted to a value lower than a predetermined value by the powder clutch 38.

In this way, the long fiber reinforced plastic strand wound on the bobbin is produced.

The production method of this embodiment includes the hauling-off step using the rotary type haul-off machine 20 and the winding-up step using the rotary type winding-up machine 30 when producing the long fiber reinforced plastic strand wound on the bobbin differently from the related art. For this reason, it is possible to individually adjust the number of twisting rotations (the number of rotation of the haul-off machine rotation body 21) by the rotary type haul-off machine 20 when forming the twisted long fiber reinforced plastic strand 4 in the hauling-off step and the number of rotation (the number of rotation of the winding-up machine rotation body 31) about the axis of the long fiber reinforced plastic strand 4 by the rotary type winding-up machine 30 when guiding the long fiber reinforced plastic strand 4 from the rotary type haul-off machine 20 to the winding-up bobbin 42 in the winding-up step. For this reason, the number of rotation about the axis of the long fiber reinforced plastic strand 4 by the rotary type winding-up machine 30 may be set to the number of rotation lower than the number of twisting rotations by the rotary type haul-off machine 20 so as to reduce the torsional elastic deformation applied to the long fiber reinforced plastic strand 4 by the rotary type haul-off machine 20. In other words, in the winding-up step using the rotary type winding-up machine 30, the number of rotation when rotating the long fiber reinforced plastic strand 4 about the same axis as that of the path line of the long fiber reinforced plastic strand 4 immediately after exiting the rotary type haul-off machine 20 may be set to the number of rotation lower than the number of rotation of the long fiber reinforced plastic strand 4 in the hauling-off step so as to reduce the torsional elastic deformation generated in the long fiber reinforced plastic strand 4 in the hauling-off step using the rotary type haul-off machine 20. As a result, the long fiber reinforced plastic strand 4 may be wound up on the winding-up bobbin 42 after reducing the torsional elastic deformation of the long fiber reinforced plastic strand 4 with the torsional elastic deformation hauled off to the rotary type haul-off machine 20.

Thus, according to the production method or the production device of this embodiment, it is possible to produce the long fiber reinforced plastic strand which is wound on the bobbin and of which the torsion is reduced in the long fiber reinforced plastic strand 4 when the long fiber reinforced plastic strand 4 is drawn out from the winding-up bobbin 42. As a result, it is possible to prevent a problem in which torsion is generated in the long fiber reinforced plastic strand drawn out from the winding-up bobbin 42 and the handling of the long fiber reinforced plastic strand is disturbed in the subsequent step. Furthermore, the appropriate number of rotation of the long fiber reinforced plastic strand 4 using the rotary type winding-up machine 30 set to be lower than the number of twisting rotations using the rotary type haul-off machine 20 may be checked by the actual operation of the production device.

Further, in this embodiment, since the rotary type winding-up machine 30 includes the powder clutch 38 as the winding tension adjuster for adjusting the winding tension of the long fiber reinforced plastic strand 4, it is possible to wind up the long fiber reinforced plastic strand 4 with an appropriate winding tension without causing the stretching or the breaking of the long fiber reinforced plastic strand 4 due to the excessive winding tension applied to the long fiber reinforced plastic strand 4.

Furthermore, the embodiment disclosed herein is an example in all respects, and does not limit the present invention. The scope of the present invention is illustrated in claims instead of the above-described embodiment, and further includes the meanings equivalent to the claims and all modifications within the scope.

In the above-described embodiment, in the long fiber reinforced plastic strand winding-up step using the rotary type winding-up machine, the long fiber reinforced plastic strand is rotated about the same axis as the rotation axis about which the reinforcing fiber bundle is rotated in the reinforcing fiber bundle (long fiber reinforced plastic strand) hauling-off step using the rotary type haul-off machine. However, the rotation axis of the long fiber reinforced plastic strand in the winding-up step may not be essentially equal to the rotation axis of the reinforcing fiber bundle in the hauling-off step. For example, the rotation axis of the long fiber reinforced plastic strand in the winding-up step may be disposed so as to be inclined with respect to the rotation axis of the long fiber reinforced plastic strand in the hauling-off step. In this case, for example, a configuration may be employed such that a roller on which the long fiber reinforced plastic strand is hung is disposed between the rotary type haul-off machine and the rotary type winding-up machine and the extending direction of the long fiber reinforced plastic strand is changed before and after the roller.

[Outline of Embodiment]

The above-described embodiment may be summarized as below.

In the long fiber reinforced plastic strand production method according to the above-described embodiment includes: an impregnation step of continuously introducing a reinforcing fiber bundle into an impregnation head and impregnating a molten thermoplastic into the reinforcing fiber bundle inside the impregnation head; a hauling-off step of forming a long fiber reinforced plastic strand by twisting the reinforcing fiber bundle which has been impregnated with the plastic in a manner that the reinforcing fiber bundle is rotated at a predetermined number of rotation about its axis while the reinforcing fiber bundle which has been impregnated with the plastic is drawn out from the impregnation head and hauling-off the formed long fiber reinforced plastic strand; and a winding-up step of guiding the long fiber reinforced plastic strand which has been hauled off in the hauling-off step to a winding-up bobbin while rotating the long fiber reinforced plastic strand about the axis of the long fiber reinforced plastic strand in the same rotation direction as that of the reinforcing fiber bundle in the hauling-off step after the hauling-off step and winding up the rotated long fiber reinforced plastic strand on the winding-up bobbin, wherein in the winding-up step, the long fiber reinforced plastic strand is rotated at the number of rotation lower than the number of rotation of the reinforcing fiber bundle in the hauling-off step so as to reduce a torsional elastic deformation generated in the long fiber reinforced plastic strand in the hauling-off step.

In the long fiber reinforced plastic strand production method, since the long fiber reinforced plastic strand is rotated about its axis at the number of rotation lower than the number of rotation of the reinforcing fiber bundle in the hauling-off step so as to reduce the torsional elastic deformation generated in the long fiber reinforced plastic strand in the hauling-off step when guiding the long fiber reinforced plastic strand to the winding-up bobbin in the winding-up step, it is possible to wind up the long fiber reinforced plastic strand on the winding-up bobbin while reducing the torsional elastic deformation of the long fiber reinforced plastic strand. Thus, in the long fiber reinforced plastic strand production method, it is possible to produce the long fiber reinforced plastic strand wound on the bobbin capable of suppressing the torsion in the long fiber reinforced plastic strand when the long fiber reinforced plastic strand is drawn out from the winding-up bobbin.

According to the long fiber reinforced plastic strand production method, in the winding-up step, a winding tension as a tension applied to the long fiber reinforced plastic strand when winding up the long fiber reinforced plastic strand on the winding-up bobbin may be maintained at a value lower than a predetermined value.

According to this configuration, it is possible to wind up the long fiber reinforced plastic strand with an appropriate winding tension without causing the breakage of the long fiber reinforced plastic strand due to the excessive winding tension applied to the long fiber reinforced plastic strand in the winding-up step.

According to the long fiber reinforced plastic strand production method, in the winding-up step, the long fiber reinforced plastic strand may be rotated about the same axis as that of the case of rotating the reinforcing fiber bundle in the hauling-off step.

According to this configuration, since an excessive force is not applied to the long fiber reinforced plastic strand in the winding-up step compared to, for example, a case where the rotation axis about which the long fiber reinforced plastic strand rotates in the winding-up step is disposed so as to be inclined with respect to the rotation axis about which the reinforcing fiber bundle rotates in the hauling-off step, it is possible to prevent flaws from being generated in the long fiber reinforced plastic strand.

According to the long fiber reinforced plastic strand production method, in the impregnation step, a plurality of the reinforcing fiber bundles may be introduced into the impregnation head so as to simultaneously impregnate the plurality of reinforcing fiber bundles with the molten thermoplastic, and in the hauling-off step, the plurality of reinforcing fiber bundles drawn out from the impregnation head may be twisted so as to form one long fiber reinforced plastic strand.

Further, the long fiber reinforced plastic strand production device according to the above-described embodiment includes: an impregnation head to which a reinforcing fiber bundle is introduced so as to impregnate the reinforcing fiber bundle with a molten thermoplastic; a rotary type haul-off machine which forms a long fiber reinforced plastic strand by twisting the reinforcing fiber bundle which has been impregnated with the plastic in a manner that the reinforcing fiber bundle is rotated about its axis while the reinforcing fiber bundle which has been impregnated with the plastic is drawn out from the impregnation head and hauls off the formed long fiber reinforced plastic strand; and a rotary type winding-up machine which draws the long fiber reinforced plastic strand which has been hauled off by the rotary type haul-off machine from the rotary type haul-off machine, guides the drawn long fiber reinforced plastic strand to a winding-up bobbin while rotating the long fiber reinforced plastic strand about the axis of the long fiber reinforced plastic strand in the same rotation direction as that of the reinforcing fiber bundle by the rotary type haul-off machine, and winds up the rotated long fiber reinforced plastic strand on the winding-up bobbin, wherein the rotary type winding-up machine is configured to rotate the long fiber reinforced plastic strand at the number of rotation lower than the number of rotation of the reinforcing fiber bundle by the rotary type haul-off machine.

In the long fiber reinforced plastic strand production device, it is possible to produce the long fiber reinforced plastic strand wound on the bobbin capable of suppressing the torsion of the long fiber reinforced plastic strand when the long fiber reinforced plastic strand is drawn out from the winding-up bobbin by the same principle as that of the long fiber reinforced plastic strand production method.

According to the long fiber reinforced plastic strand production device, the rotary type winding-up machine may include a winding tension adjuster which adjusts a winding tension so that the winding tension as a tension applied to the long fiber reinforced plastic strand when winding up the long fiber reinforced plastic strand on the winding-up bobbin is maintained at a value lower than a predetermined value.

According to this configuration, it is possible to wind up the long fiber reinforced plastic strand with an appropriate winding tension without causing the breakage of the long fiber reinforced plastic strand due to the excessive winding tension applied to the long fiber reinforced plastic strand when the rotary type winding-up machine winds up the long fiber reinforced plastic strand.

According to the long fiber reinforced plastic strand production device, the rotary type winding-up machine may rotate the long fiber reinforced plastic strand about the same axis as the rotation axis of the reinforcing fiber bundle by the rotary type haul-off machine.

According to this configuration, since an excessive force is not applied to the long fiber reinforced plastic strand when the rotary type winding-up machine winds up the long fiber reinforced plastic strand compared to, for example, a case where the rotation axis about which the long fiber reinforced plastic strand is rotated by the rotary type winding-up machine is disposed so as to be inclined with respect to the rotation axis about which the reinforcing fiber bundle is rotated by the rotary type haul-off machine, it is possible to prevent flaws from being generated in the long fiber reinforced plastic strand when the rotary type winding-up machine winds up the long fiber reinforced plastic strand.

According to the long fiber reinforced plastic strand production device, the production device may further include a plurality of fiber supply units which send a reinforcing fiber bundle, and the impregnation head may be configured to simultaneously impregnate, with the molten thermoplastic, a plurality of the reinforcing fiber bundles continuously guided from the plurality of fiber supply units.

As described above, according to the above-described embodiment, it is possible to produce a long fiber reinforced plastic strand wound on a bobbin capable of suppressing a torsion being generated in the long fiber reinforced plastic strand when the long fiber reinforced plastic strand is drawn out from the winding-up bobbin.

The invention claimed is:

1. A long fiber reinforced plastic strand production method comprising:
    an impregnation step of continuously introducing a reinforcing fiber bundle into an impregnation head and impregnating a molten thermoplastic into the reinforcing fiber bundle inside the impregnation head;
    a hauling-off step of forming a long fiber reinforced plastic strand by twisting the reinforcing fiber bundle, which has been impregnated with the plastic, in a manner that the reinforcing fiber bundle is rotated at a predetermined number of rotation about its axis while the reinforcing fiber bundle, which has been impregnated with the plastic, is drawn out from the impregnation head, and hauling-off the formed long fiber reinforced plastic strand; and
    a winding-up step of guiding the long fiber reinforced plastic strand, which has been hauled off in the hauling-off step, to a winding-up bobbin while rotating the long fiber reinforced plastic strand about the axis of the long fiber reinforced plastic strand in the same rotation direction as that of the reinforcing fiber bundle in the hauling-off step after the hauling-off step, and winding up the rotated long fiber reinforced plastic strand on the winding-up bobbin,
    wherein in the winding-up step, the long fiber reinforced plastic strand is rotated at the number of rotation smaller than that of the reinforcing fiber bundle in the hauling-off step so that a torsional elastic deformation, which has been generated in the long fiber reinforced plastic strand in the hauling-off step, is reduced.

2. The long fiber reinforced plastic strand production method according to claim 1,
    wherein in the winding-up step, a winding tension, which is a tension applied to the long fiber reinforced plastic strand when winding up the long fiber reinforced plastic strand on the winding-up bobbin, is adjusted so as to be maintained at a value lower than a predetermined value.

3. The long fiber reinforced plastic strand production method according to claim 1,
    wherein in the winding-up step, the long fiber reinforced plastic strand is rotated about the same axis as that of the case of rotating the reinforcing fiber bundle in the hauling-off step.

4. The long fiber reinforced plastic strand production method according to claim 1,
    wherein in the impregnation step, a plurality of the reinforcing fiber bundles are introduced into the impregnation head so that the molten thermoplastic is simultaneously impregnated into the plurality of reinforcing fiber bundles, and
    wherein in the hauling-off step, the plurality of reinforcing fiber bundles, which have been drawn out from the impregnation head, are twisted so as to form one long fiber reinforced plastic strand.

* * * * *